Oct. 26, 1954     C. P. SLAGLE     2,692,669
MEANS FOR TRANSFERRING ORIENTED ARTICLES
Filed Sept. 12, 1949     3 Sheets-Sheet 1
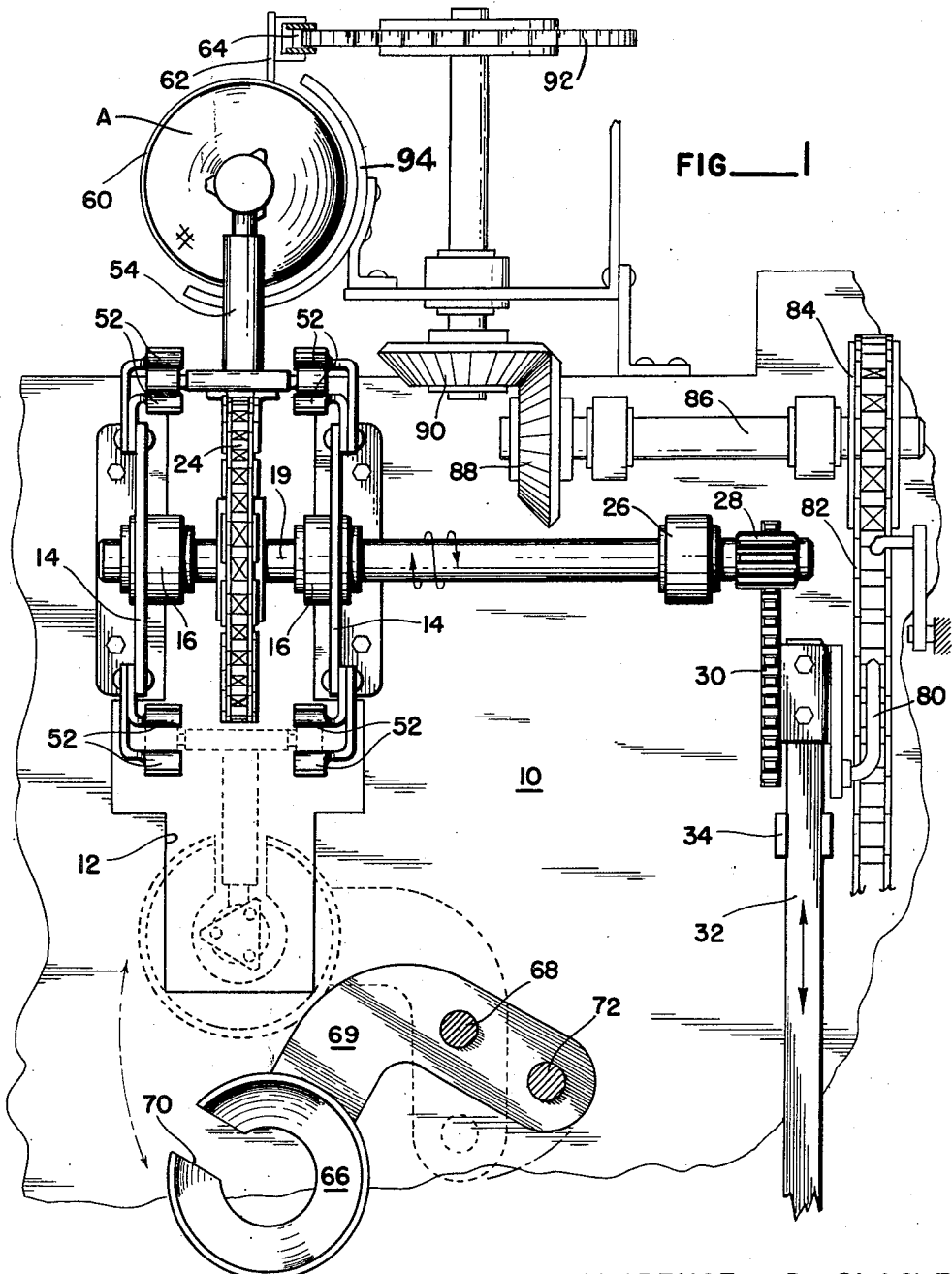
CLARENCE P. SLAGLE
Inventor

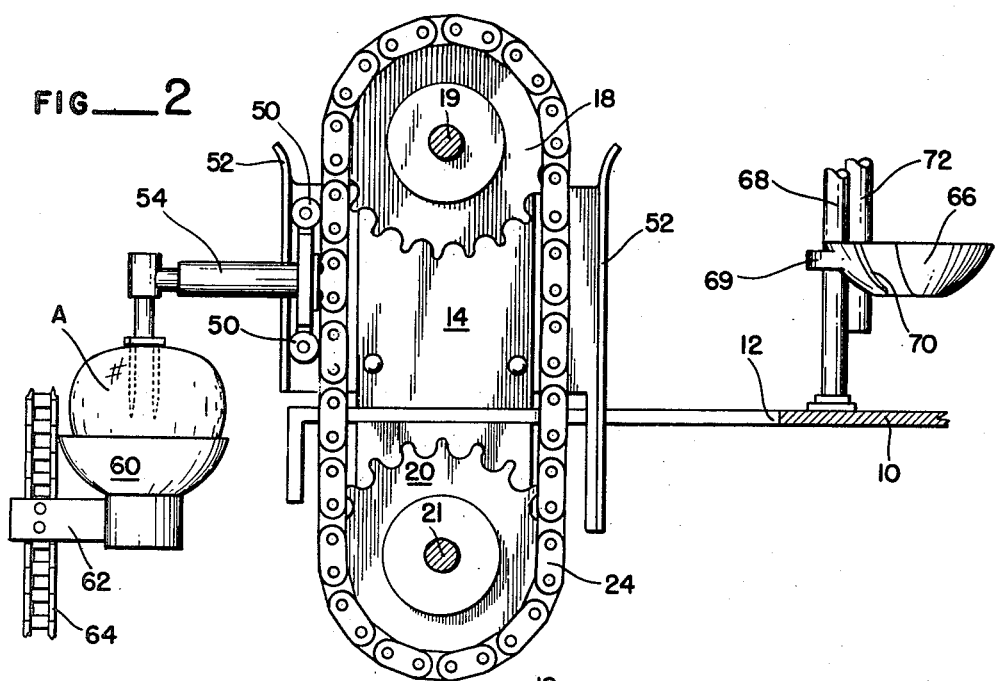
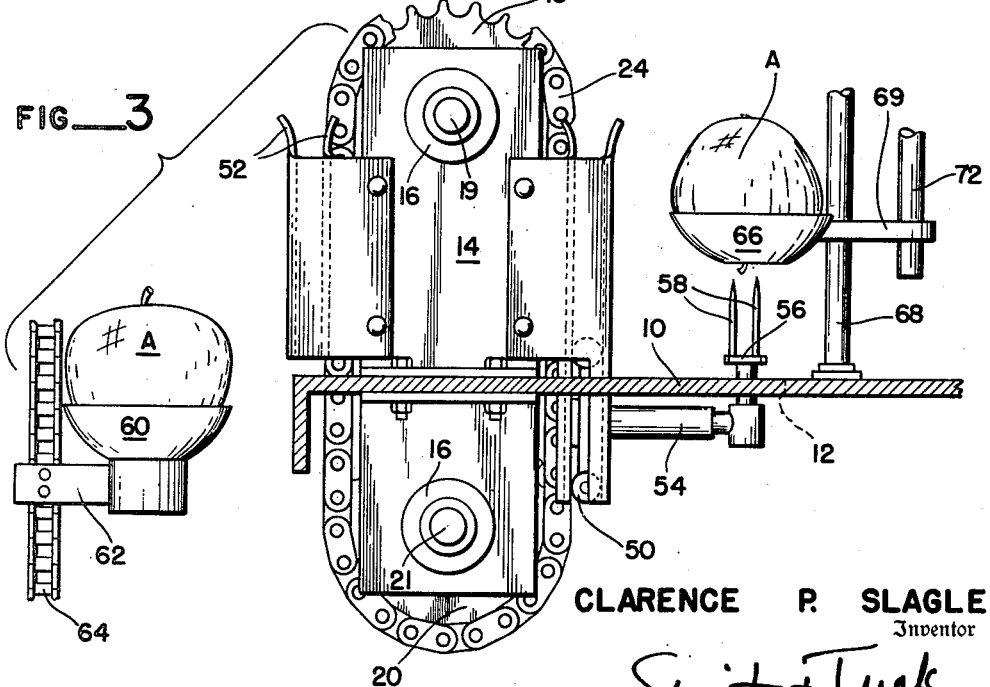

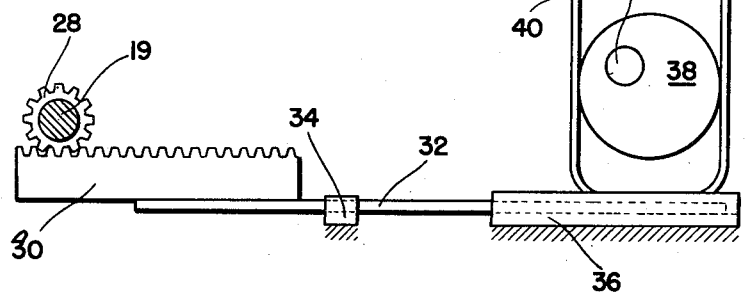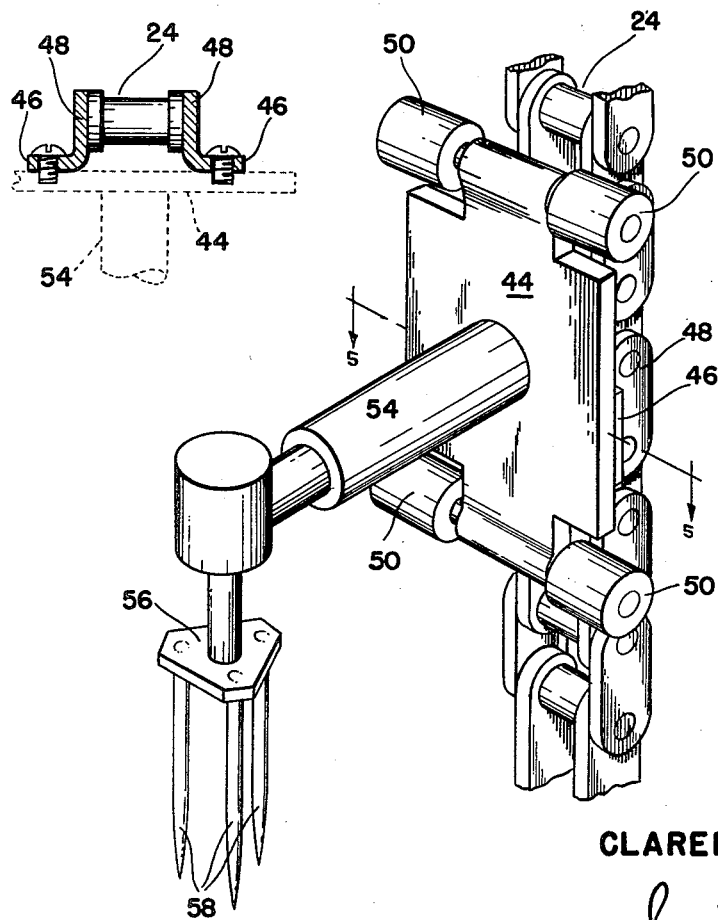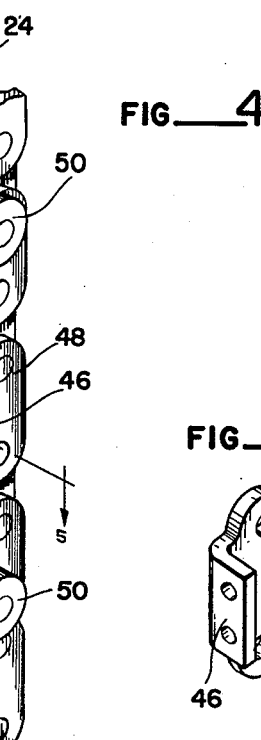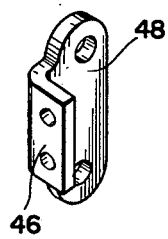

Patented Oct. 26, 1954

2,692,669

UNITED STATES PATENT OFFICE 2,692,669

MEANS FOR TRANSFERRING ORIENTED ARTICLES

Clarence P. Slagle, Selah, Wash.

Application September 12, 1949, Serial No. 115,157

3 Claims. (Cl. 198—33)

This invention relates to a means for transferring oriented articles and, more particularly, is a mechanism for transferring articles of vegetation and the like from a first to a second station.

While throughout this specification I shall refer to the application of the invention in the transfer of apples between stations or positions, it will be apparent to those skilled in the art that the invention is equally applicable to other fields in substantially its disclosed form. I do not intend, therefore, to specifically limit my invention to its use in the handling of apples and similar fruit by reason of these following exemplifying descriptions pertaining to the apple industry.

In the dehydrating and fresh food preparation fields wherein fruits such as apples are handled in huge quantities it is common to employ peeling machines. In such peeling machines there is usually a vertical rotary spindle on which an apple is impaled for turning movement relative a peeling knife. The impaling of the apple is today accomplished by manually placing it in a swingable and elevatable cup-like receptable which moves the apple under the spindle and raises it for impaling. Such machines are arranged in gangs and are so organized that a single worker normally serves two or three spindles. The worker picks up apples from a source, such as a conveyor belt, and places them one after another on the receptacle. Apparently no practical mechanism has been previously devised to accomplish this manual operation mechanically in a practical and efficient manner as I have searched diligently for such. The problem involves two main phases; one, the orientation of the fruit so that in the peeling operation of a fruit its vertical axis is aligned with the peeling spindle, and secondly the continuous and accurate placement of the fruit in the swingable receptacles.

As more fully shown in my co-pending application, Serial No. 124,370, filed October 29, 1949, now Patent No. 2,572,773, granted October 23, 1951, the invention entitled Article Orienting Mechanism overcomes the first phase of the problem by continuously selecting apples from a source and raising them, while vertically aligning their cores, to a delivery station. In the instant application I deal with the second phase of the problem which involves transferring the apples from the delivery or first station to the cup-like receptacle which I designate the second position.

It has been among the important objects of this invention to provide a transfer mechanism which accurately and rapidly transfers an oriented fruit from one cup to another without destroying the orientation of the fruit, which transfer mechanism, in accomplishing the transfer, reduces injury to the meaty portion of the fruit; which is particularly designed to transfer apples or the like so that their previously obtained orientation with the core section upright is unchanged when the transfer has been accomplished, which mechanism is simple and easy to construct and which will have a long and useful life despite condition of hard usage over long substantially continuous runs or series of operations.

In accordance with the present invention I spear an oriented fruit at a first position from above downward along its upright axis and cause the same to move through an upwardly arched semi-circular path while at the same time the fruit and spear are up-ended. As the fruit reaches the end of said path, which is adjacent the second station, it is intercepted and stripped from the spear, whereupon at this point a similar but reversed vertical orientation of the fruit is obtained as the fruit is deposited in a receiver. The invention is simply practiced by mounting a spear on a flexible strand that passes over an arcuate guide member between said first and second stations. The strand moves reciprocally over the guide member and carries the spear from the first station to the second while the spear and the fruit impaled thereon is up-ended. At the second station a slotted receiver intercepts the fruit and strips it from the spear as the latter passes through the slot. Normally the receiver and the fruit it supports is removed from above the spear before the latter reverses its travel through the reciprocal travel of the strand. The spear again reaching the first station, impales a following fruit that, during the interval, has been delivered to that station.

The invention will now be explained in detail with reference to the accompanying drawings, in which:

Figure 1 is a plan view of the transfer mechanism;

Figure 2 is a view in side elevation of the transfer device with the spear in a first position and with portions omitted to convenience of illustration;

Figure 3 is a similar side view of the transfer device in the second position;

Figure 4 is an enlarged perspective view of the spear and carrying strand;

Figure 5 is a horizontal cross-sectional view taken on line 5—5 of Figure 4;

Figure 6 is a perspective view of a spear-supporting link of the strand; and

Figure 7 is a schematic view of certain actuation means used in connection with my transfer mechanism.

In Figure 1 I show a table 10 which comprises the main support means for my transfer device and which has a slot 12 extending inward from one edge in which the transfer device operates. Mounted on the table above and below its surface and adjacent the slot 12 is a pair of cheek plates 14 that position bearings 16 for shafts 19 and 21, the sprockets 18 and 20 respectively being mounted thereon. The sprockets 18 and 20 are preferably located one over the other to provide an upright guide means for the encircling endless chain belt 24.

As shown in Figure 1, the upper shaft 19 extends to one side of the slot 12 and is journalled remote from the sprockets in bearing 26. An overhanging end of shaft 19 is provided with pinion 28 which meshes with rack 30 on the reciprocal bar 32. Bar 32, as can be seen in Figure 7, is guided in ways 34, 36 and is caused to move backward and forward through the action of rotary cam 38 in the cam follower loop 40. The shaft 42, to which cam 38 is keyed, is normally a rotary part of a peeling machine with which this invention is usually employed, or it may be any rotary shaft such as that of a motor.

In Figure 4 I show a traveller comprising a base plate 44 that is attached to ears 46 of links 48 forming part of the chain 24. Plate 44 supports at each end a pair of outstanding rollers 50, 50 which are free to rotate. Adjacent the straight or intermediate portions of the path of the chain and between the sprockets are pairs of tracks or guide ways, formed of spaced-apart flare-ended bars 52, between which the rollers 50 are interposed for the purpose of insuring vertical positioning of the base plate 44, at or near each end of its path of travel.

Plate 44 supports the outstanding spear arm 54 that has the angularly disposed spear head 56 mounting one or more spears 58. As shown in Figures 2 and 3, the spear travels from the downwardly-directed first position to the upended second position, during which travel fruit impaled on the spear will be transferred from the receiving position to the delivery position.

Fruit such as apples are delivered, as more fully shown in my co-pending application, Serial No. 124,370, to the spear in a cup-like receptacle 60, mounted by arm 62 to one side of the conveyor chain 64. In such receptacle the fruit has been previously oriented so that, as in the case of an apple, the core is upright with either the stem or blossom end downward. For the purposes of the transfer to the peeler machine it makes no difference which end is upward.

Through the reciprocal action obtained in sprocket 18 by means of the reversible rack-and-pinion means shown in Figures 1 and 7, chain 24 is caused to travel first in one direction and then in the other. In such travel the spear 58 is carried first downward into the core of an apple A to impale the same and then, in the reverse direction, to raise it up and over the sprocket 18, thence down the other side of the path which is generally of an inverted U-shape. It will be noted that when the apple has travelled thusly, it has still the same vertical position of its axis although the apple has been reversed or upended.

At the end of its path of travel the apple A is intercepted by a second cup-like receiver 66 that is swingably mounted on post 68 by means of crank arm 69. Cup 66 has a slot 70 in its periphery. A pin 72, which is normally part of the peeling machine, causes the arm 69 and cup 66 to swing from the dotted line position of Figure 1 to the solid line position and back again. The apple is subsequently impaled on the peeler spindle of the peeling machine during this interval.

The apple is intercepted as the spear passes downward through slot 70 of cup 66 and is stripped from the spear, which latter descends below the cup sufficiently to permit the cup 66 to swing as described. The spear reverses its direction of travel while the cup is in the removed position and returns over sprocket 18 to the first spear position to which has been delivered, by a following cup 60, a second apple B into which the spear penetrates as before.

It is helpful that the spear at both ends of its travel in said arcuate path moves into substantially a vertical position. To facilitate this, the rollers 50 and guideways 52 have been provided to prevent "slap" of the spear as the somewhat flexible chain comes to rest during the moment it is reversing its direction of travel.

I have shown in Figure 1 in faint lines parts of the related orienting means of application, Serial No. 124,370. These include a pusher dog 80 carried by reciprocal arm 32 and which engages an endless chain 82 that passes around sprocket 84 on shaft 86. Bevel gears 88 and 90 change the direction of travel of such rotative force which supplies power to the sprocket 92 and cause the movement upward of chain 64. A curved guide 94 is shown partially encircling the cup 60 to prevent accidental dislodgment of apples or other fruit carried thereby.

Although I have shown this transfer mechanism associated with a certain orienting machine and have described its connection with a Pease or Coon peeler machine, it is to be understood, of course, that its use is not so limited as the application of the principles of this invention, but will certainly find other uses within the skills of those familiar with the transfer art.

From the foregoing it should be apparent that I have provided, in extremely simple and easily constructed machinery, a device that accomplishes a transfer operation with facility. Such device permits the handling of apples and other fruit without marring or harming their meat portions, since the fruit is engaged only at its core which is usually to be discarded later anyway. It will be also observed that the previously obtained orientation of the core, as in the case of apples, is retained in the second position after the transfer has been effected.

Having thus described my invention, I claim:

1. A mechanism for transferring fruit from a first position oriented with its core extending vertically to a second position, horizontally removed from said first position, with its core in the same orientation only inverted, comprising: means for supporting from below a fruit at said first position; a spear; between said positions a vertically separated pair of sprockets having their axes at right angles to the line between said positions; means for supporting said sprockets; an endless, flexible chain encircling said sprockets and said spear being secured to said chain; means for reciprocatively moving said chain about said sprockets in a first direction and then in a second direction so that said spear travels an inverted-U-shaped path terminating adjacent said first and second positions; said spear being disposed in position to move downward into a fruit at said first position during movement of said chain in said first direction, said spear being inverted during movement of said chain in said second direction whereby it reaches second position directed upwardly; and means at said second position to strip fruit from said spear and to support such fruit in the orientation in which it is delivered to said second position.

2. The structure according to claim 1 in which the spear is rigidly carried by a traveler mounted upon the chain and vertical tracks are provided adjacent said first and second positions for engagement by said traveller to insure straight-line vertical movement of said spear near said first and second positions, and said means at said second position being a cup-like receptacle having a slot in its periphery disposed to pass said spear during the stripping of fruit therefrom.

3. A mechanism for transferring fruit from a first position oriented with its core extending vertically to a second position, horizontally removed from said first position, with its core in the same orientation only inverted, comprising: means for supporting from below a fruit at said first position; a spear; reciprocative means for supporting and moving said spear reciprocatively along an inverted-U-shaped path terminating at one end adjacent said first position and terminating at the other end adjacent said second position, said reciprocative means guiding said spear downwardly vertically as it approaches said first position to engage fruit on said supporting means along its core, said reciprocative means inverting said spear as it moves to said second position and guiding said spear to extend upwardly vertically as it reaches said second position; and a supporting member at said second position permitting said spear to pass and intercepting and receiving such fruit to support the same in its oriented position.

References Cited in the file of this patent

UNITED STATES PATENTS

| Number | Name | Date |
|---|---|---|
| 902,142 | Foss et al. | Oct. 27, 1908 |
| 1,114,454 | Fetrow et al. | Oct. 20, 1914 |
| 1,401,429 | Moone | Dec. 27, 1921 |
| 1,416,585 | Stables | May 16, 1922 |

FOREIGN PATENTS

| Number | Country | Date |
|---|---|---|
| 153,996 | Germany | Sept. 27, 1904 |
| 322,360 | Germany | May 23, 1919 |